US00RE33852E

United States Patent [19]

Gibot et al.

[11] E Patent Number: Re. 33,852

[45] Reissued Date of Patent: Mar. 24, 1992

[54] CHAMBER AND PROCESS FOR THERMAL TREATMENT COMPRISING A COOLING PHASE

[75] Inventors: Claude Gibot, Malakoff; Jean-Pierre Peyremorte, Montelimar; Richard Sojka, Bonlieu, all of France

[73] Assignees: Carboxyque Francaise, Puteaux; Societe Nouvelle Des Etablissements J. LaGarde, Montelimar, both of France

[21] Appl. No.: 507,883

[22] Filed: Apr. 12, 1990

Related U.S. Patent Documents

Reissue of:

[64] Patent No.: 4,878,353
Issued: Nov. 7, 1989
Appl. No.: 244,516
Filed: Sep. 9, 1988

[30] Foreign Application Priority Data

May 2, 1988 [FR] France ..... 88 05879

[51] Int. Cl.[5] ..... F25D 17/02
[52] U.S. Cl. ..... 62/52.1; 62/434
[58] Field of Search ..... 62/52.1, 434, 374

[56] References Cited

U.S. PATENT DOCUMENTS

| | | | |
|---|---|---|---|
| 4,237,700 | 12/1980 | Rothchild | 62/514 R |
| 4,304,293 | 12/1981 | Scheiwe et al. | 165/12 |
| 4,399,658 | 8/1983 | Nielsen | 62/52 |
| 4,448,029 | 5/1984 | Keller | 62/374 |
| 4,475,351 | 10/1984 | Klee | 62/374 |
| 4,481,782 | 11/1984 | Mukerjee | 62/374 |
| 4,485,641 | 12/1984 | Angelier et al. | 62/514 R |
| 4,580,409 | 4/1986 | Angelier et al. | 62/340 |
| 4,644,754 | 2/1987 | Gibot | 62/384 |

FOREIGN PATENT DOCUMENTS

| | | |
|---|---|---|
| 1128329 | 7/1982 | Canada . |
| 1588664 | 4/1970 | France . |
| 2019050 | 6/1970 | France . |
| 2462673 | 2/1981 | France . |
| 2526927 | 11/1983 | France . |
| 2593593 | 7/1987 | France . |

*Primary Examiner*—Ronald C. Capossela
*Attorney, Agent, or Firm*—Young & Thompson

[57] ABSTRACT

A treatment chamber for a charge comprises at least oen door, internal walls delimiting a treatment space, passages for the recirculation of gas, and apparatus for circulating gases in the treatment space and the passages. The circulating apparatus extracts the gases from the treatment space (4) and sends them through the passages (9,9'). The chamber is provided with injectors (12) for cryogenic fluid and an outlet (16) for evacuation of gas. The injectors are at least one nozzle (12) to spray liquid nitrogen or carbon dioxide and are disposed adjacent the circulating apparatus, which is in the form of a fan (8), the injectors (12) being directed toward the inlet of this fan. In the corresponding treatment process, a cryogenic gas is circulated through the charge, a cryogenic fluid e.g. liquid carbon dioxide or liquid nitrogen is injected into the gas flow leaving the charge, and the cooled gas is recirculated so as to cause it to pass again through the charge in the same direction. All contact between the gas and the charge is prevented during its recirculation.

26 Claims, 2 Drawing Sheets

CHAMBER AND PROCESS FOR THERMAL TREATMENT COMPRISING A COOLING PHASE

Figure 1:
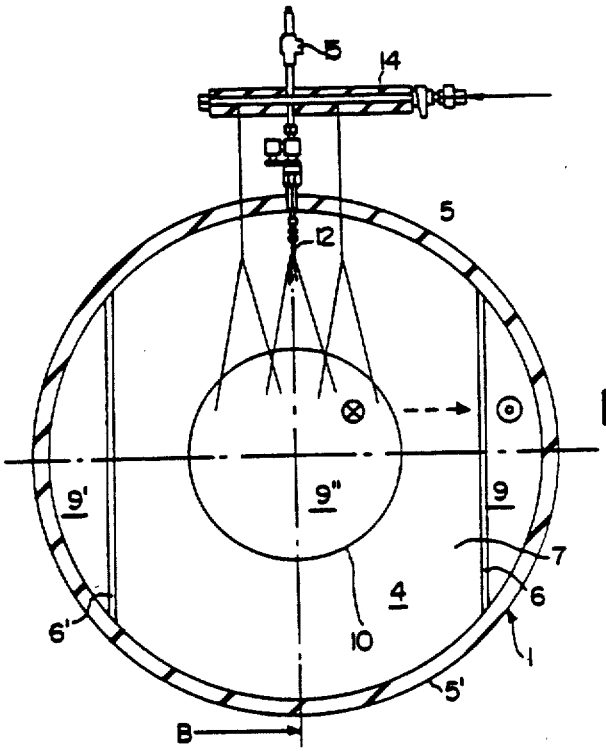

Matter enclosed in heavy brackets [ ] appears in the original patent but forms no part of this reissue specification; matter printed in italics indicates the additions made by reissue.

The present invention relates to a chamber for thermal treatment as well as a process for thermal treatment comprising a cooling phase using cryogenic fluid.

In the food and pharmaceutical industries in particular, charges of numerous products or objects are treated by cooking and/or sterilization and then cooling.

This treatment comprises generally a heating, sterilizing or cooking stage followed by cooling. The heating stage can be carried out with steam, which is very satisfactory as to speed of treatment and uniformity of temperatures throughout the products. The cooling is necessary to the ultimate handling of the objects in the case of sterilization or the preservation of the products in the case of food products.

The cooling, for reasons of economy (speed) or for reasons of quality of the cooked products (in the case of food products) should be effected according to temperature profiles according to time which are precise and set by industry standards.

The chambers and the processes proposed heretofore are incompatible with industrial requirements of profitability and veterinary standards for treatment of consumable products.

For the cooling, three techniques are usually used.

The technique of forced air cooled by indirect heat exchange requires a very long treatment time, and the presence of finned exchangers within the chamber, these exchangers being difficult to clean.

By the technique of sprayed water and trickling water, the cooling of the charge is not uniform. A known solution for lack of uniformity consists in rendering the charge mobile during treatment, for example by rotation.

The technique by immersion permits more uniform cooling, but this process is limited to higher temperature cooling of the order of +10° C., and for treatment times of the order of 2 hours.

Moreover, immersion, like spraying of ice water, requires water storage at +1 or 2° C., comprising cooling means, (large size and high cost, substantial maintenance); they are incompatible with the cooling of unpackaged bulk goods; and finally they require a bactericidal treatment of the water before use (chlorination for example), the suitable bacteriological agent having the tendency to degrade the material by physico-chemical attack (intergranular corrosion).

The present invention provides a solution to the lack of temperature uniformity while maintaining a suitable speed of refrigeration no matter what the charge to be cooled, (sealed packaged product or bulk product). Moreover, the temperature consignment may be negative.

The process and chambers according to the invention may be practiced and used in food industries, pharmaceutical industries, the hospital industry, in chemical industries, plastics and composites, for thermal treatment of materials and in the electronic industry.

The present invention relates to a thermal treatment chamber for a charge comprising at least one door, the internal walls delimiting a treatment space and passages for the recirculation of gas, and means for circulating gases in the treatment space and said passages, characterized in that said means for circulation of the gases extract the gases from said space and send them through said passages and in that the chamber is moreover provided with injection means for cryogenic fluid and means for evacuation of gas.

The treatment according to the invention may therefore take place in a single chamber, so that the whole of the treatment, even when this latter comprises a final quick freezing phase, may be carried out without manipulation of one chamber in another chamber, and without manipulation nor movement of the charge in the chamber wherein the cooling is completely uniform.

The chambers are in general cylindrical and insulated, using steam as the heat transfer fluid and adapted to treat products by cooking, pasturization, sterilization, or any other type of thermal treatment, followed by cooling.

According to a particular embodiment, the chambers are autoclaves, adapted to operate under pressure.

The present invention also relates to a process for treatment in a chamber of a charge of products and/or objects comprising a cooling phase, characterized in that to carry out the cooling phase, there is caused to circulate a flow of a cryogenic gas through the charge, there is injected in the gas flow leaving the charge a cryogenic fluid and the cooled gas is recirculated to cause it to pass again through the charge in the same direction.

Figure 2:
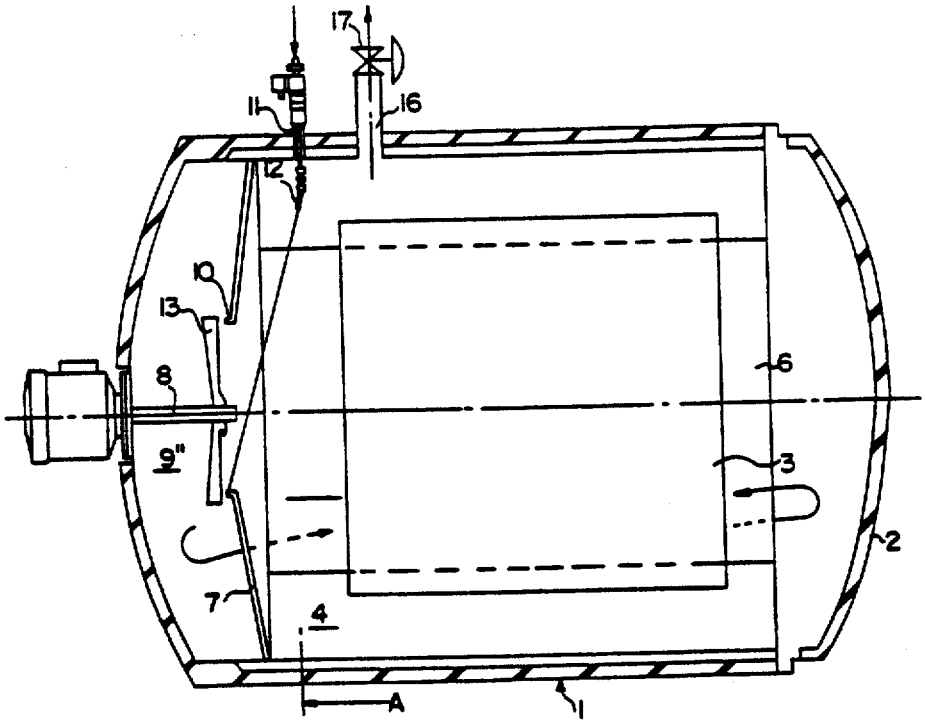
Figure 3:
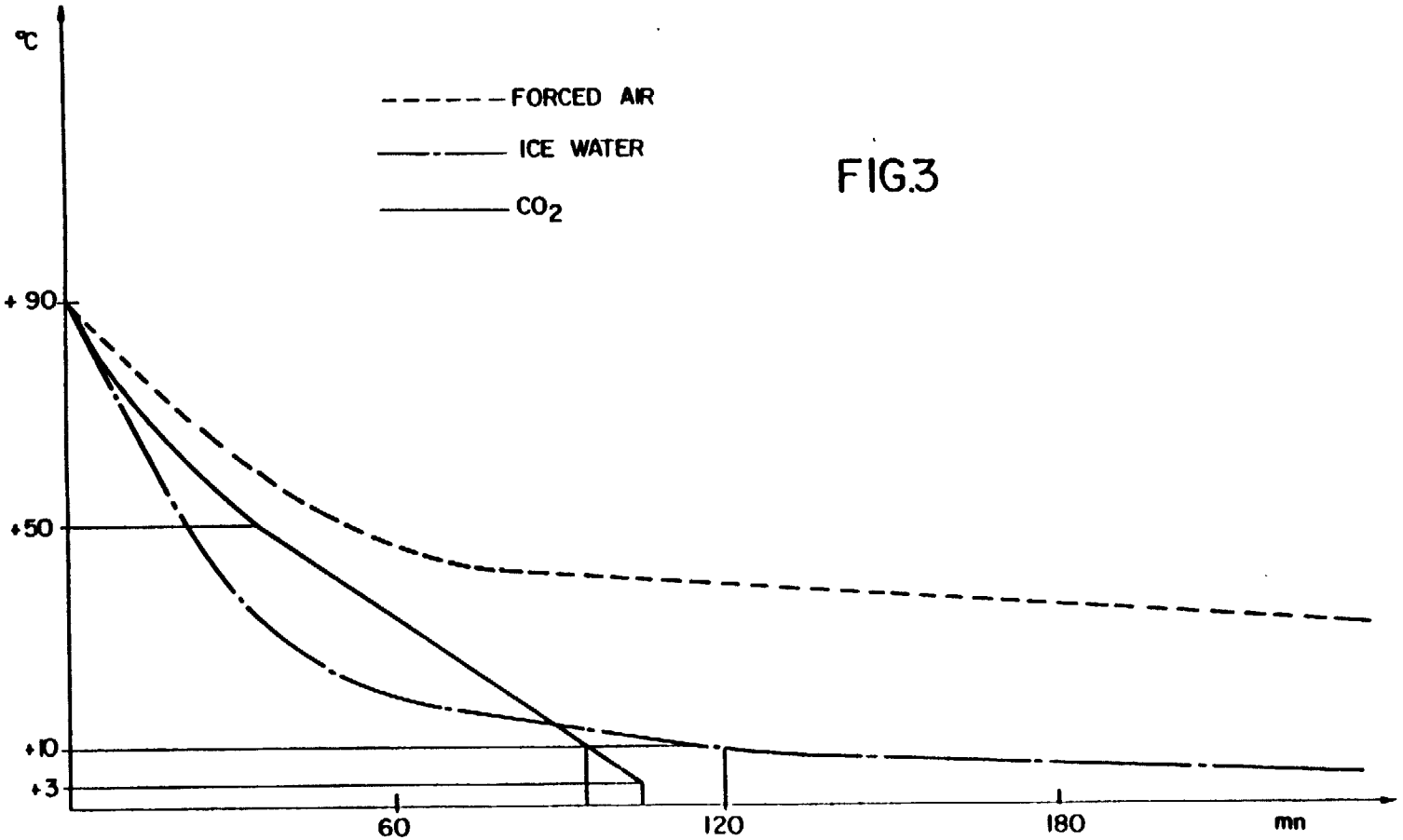

FIG. 1 shows a partial cross sectional view on the line A shown in FIG. 2, of a chamber according to the invention and FIG. 2 shows a view thereof in axial section on the line B shown in FIG. 1. FIG. 3 shows the temperature as a function of time for different cooling agents.

As will be apparent from the figures, the cylindrical chamber 1 having insulated walls adapted to resist pressure, comprises a door 2. A charge 3 of products to be treated is disposed in the treatment space 4 delimited by the walls 5, 5' of the chamber 1 the partitions 6, 6', the door 2 and the truncated cone 7 disposed at the end of the chamber opposite the door 2. The partitions 6, 6' and the cone 7 delimit passages 9, 9', 9''.

A fan 8 driven by a motor located outside the chamber, is disposed along the axis of the chamber 1, opposite the door 2. The fan 8 is adapted to draw the gas flow out from the treatment space 4 through the cone 7.

The opening 10 of the truncated cone 7 faces fan 8.

The wall of chamber 1 is traversed adjacent ventilator 8 by at least one conduit 11 for supplying cryogenic fluid, and has within chamber 1 a spray nozzle 12 directing fluid spray toward the blades 13 of the fan.

Three nozzles are provided, as shown in FIG. 1 in which a conduit 14 provided with a valve 15 permits dividing the cryogenic fluid from a reservoir (not shown) among the three nozzles, but only a single nozzle 12 is shown in detail. The number of nozzles depends on the capacity of the autoclave.

An outlet opening 16 for gas is moreover provided in the wall 5 of the chamber. Evacuation of the gases is controlled by a valve 17.

The nozzle 12 can be a nozzle for spraying liquid carbon dioxide or liquid nitrogen.

The operation of the chamber thus described is as follows. When the fan 8 operates, it circulates gases as indicated on the drawings by arrows. The gas flow passes through the charge 3 disposed in the treatment space in the direction of fan 8 and flows back toward space 9''. During this passage through the charge, it is heated while giving up its cold. The cryogenic fluid injected by the nozzle or nozzles against the blades flows back with the heated gas into the space 9''. In the space 9'', the mixture of gas and of the added cryogenic fluid recirculates through the passages 9 and 9' toward the opposite end of the autoclave, and passes through the charge in a direction toward the fan.

Thus, the process according to the invention can prevent any contact between the gas and the charge during this recirculation.

The pressure is regulated by the valve 17 closing the opening 16 of the gas outlet. Preferably, the opening 16 is disposed adjacent the end of the charge and if possible beyond the charge on the side of the fan.

This gas circulation is particularly advantageous for uniformity of the temperature of the flow. Thus, the fan serves as a mixer for the circulated medium plus what is added, and ejects a gas of uniform temperature. The cryogenic fluid and the flow thus mix completely during their passage through the space 9'' and the passages 9 and 9' before passing through the charge.

Moreover, the arrangement of the nozzle in the treatment space 4 and nOt in the space 9'' has an advantage because the fan shaft is protected.

To practice the process according to the invention, $CO_2$ is withdrawn from a reservoir through an insulated nozzle to valve 15 and thence to the injection nozzle or nozzles 12.

The arrangement of the nozzle 12 and its position in the autoclave, preferably adjacent the fan, permits a complete vaporization of the liquid $CO_2$ upon opening of the electrovalve thereby delivering maximum cooling.

As shown in FIG. 2, the valve and nozzle direct the stream of $CO_2$ toward the fan of the autoclave so as to mix substantially immediately the added $CO_2$ with the flowing medium.

The pressure prevailing in the autoclave may be adjusted.

As a modification, liquid nitrogen can be used.

The process according to the invention can be adapted to many types of treatments, as well as cooking and cooling of packaged food products or the sterilization and cooling of objects for the pharmaceutical industry and the treatment of blood products in pouches.

Thus, in the case of consumable products, the temperature should fall from a cooking temperature of the order of 60° to 90° C., in less than two hours, to a core temperature of 10° C. This profile can be achieved with $CO_2$ for example, as shown in FIG. 3, in a reliable manner (reaching 3° C.) and more rapidly than with forced air (cooled in a finned exchanger by circulating cold water) or sprayed ice water at 2° C.

A first phase with water or air could also be combined with a subsequent phase according to the invention.

An advantage of the process according to the invention will be seen when the consumable products are packaged under gas and are cooked and then cooled. Thus, it is then important that the pressure remain relatively constant during the whole of the treatment in the chamber, particularly for the appearance of the product. The pressure profile is easily controllable when all the treatment is effected with cold gas or even hot and then cold.

The process according to the invention, as a modification, comprises moreover as the cold stage the quick freezing of the products.

By the process according to the invention, and in the described autoclave, it is possible to cook and quick freeze products in the same chamber.

Moreover, in the case of bulk products that are to be sterilized, the $CO_2$ particularly has an advantageous bacteriostatic effect compared to water or air.

What is claimed is:

[1. A treatment chamber for cooling a charge of solid material, comprising a heat insulated cylindrical casing adapted to resist pressure, said casing having a substantially horizontal axis and first and second opposite end closures, the chamber defining a first space for receiving said charge intermediate said end closures, a transverse partition defining a second space adjacent said first end closure, said partition having an axial opening therethrough, a fan disposed in said second space for drawing gas from said first space through said opening into said second space, longitudinally extending duct means communicating between said second space and the interior of said casing adjacent said second end closure, nozzle means adjacent said partition for spraying a cryogenic fluid toward said opening, and exhaust means for exhausting from the interior of said chamber gas generated from said cryogenic fluid cooling the charge.]

[2. A treatment chamber as claimed in claim 1, said nozzle means being disposed on the same side of said partition as said first space.]

[3. A treatment chamber according to claim 1, said duct means being defined by portions of an internal wall of said casing and longitudinally extending partitions in contact with said internal wall.]

[4. A treatment chamber according to claim 1, wherein said second end closure comprises a door for the introduction of the charge to be treated.]

[5. A treatment chamber according to claim 1, and valve means in said exhaust means for regulating the pressure within said treatment chamber.]

6. A treatment process for cooling a solid material charge with an endless circulation of cooling gas, comprising positioning the charge to be cooled in a chamber having two ends, drawing gas past and in contact with the charge toward one end of said chamber *by means of a fan having blades*, recirculating said gas toward the other end of the chamber through duct means isolated from the charge, returning said gas to said one end in contact with the charge, and injecting cryogenic fluid into the gas downstream from the charge *and against the upstream side of said fan blades.*

7. A treatment process for cooling a charge of solid material, comprising disposing the material in a horizontal chamber having two closed ends with the solid material disposed in the chamber intermediate said ends and with duct means extending between said ends but isolated from said material, disposing a fan *having blades* adjacent one said end to draw gas from the vicinity of said material and to direct said gas through said duct means toward the other said end of the chamber and thence back past and in contact with said material toward said one end, and spraying cryogenic fluid [toward said fan] *against the upstream side of said fan blades* to vaporize said fluid.

8. A process according to claim [1] *7*, and providing restricted exit of gas from said chamber upon vaporization of said cryogenic fluid, thereby to provide a positive pressure within said chamber.

9. A process according to claim 7, and contacting the material with steam before cooling the same.

10. A process according to claim 7, and previously contacting the material with forced air to cool the same.

11. A process according to claim 7, and previously contacting the material with sprayed water to cool the same.

12. A process according to claim 7, and previously contacting the material with trickling water to cool the same.

13. A process according to claim 7, and previously immersing the material in water to cool the same.

14. A process according to claim 7, in which said cryogenic fluid is liquid carbon dioxide.

15. A process according to claim 7, in which said cryogenic fluid is liquid nitrogen.

16. A process according to claim 7, comprising a quick freezing stage.

*17. A treatment chamber for cooling a charge of solid material, comprising a heat insulated casing adapted to resist pressure, said casing having a main axis and first and second opposite end closures, the chamber defining a first inner space for receiving said charge intermediate said end closures, a transverse partition defining a second inner space adjacent said first end closure, said partition having an axial opening therethrough, a fan having blades disposed in said second space for drawing gas from said first space through said opening into said second space, duct means communicating between said second space and the interior of said casing adjacent said second end closure, nozzle means adjacent said partition for spraying a cryogenic fluid, and exhaust means for exhausting from the interior of said chamber gas generated from said cryogenic fluid cooling the charge.*

*18. A treatment chamber as claimed in claim 17, said nozzle means extending into said first space.*

*19. A treatment chamber according to claim 17, said duct means being defined by portions of an internal wall of said casing and longitudinally extending partitions in contact with said internal wall.*

*20. A treatment chamber according to claim 17, wherein said second end closure comprises a door for the introduction of the charge to be treated.*

*21. A treatment chamber according to claim 17, and valve means in said exhaust means for regulating the pressure within said treatment chamber.*

*22. A chamber for cooling a charge comprising a casing having first and second opposite end closures and inner walls defining within said chamber, intermediate said end closures, a first space for receiving said charge having an access end adjacent said first end closure, a second space adjacent said second end closure, and passage means communicating between said second space and said access end of said first space, a fan having blades disposed in said second space and driven by a motor outside said second end closure so as to draw gas from said first space into said second space and into said passage means towards said access end of said first space, and nozzle means opening into said first space adjacent said second space for spraying a cryogenic fluid against the upstream side of said fan blades.*

*23. The treatment chamber of claim 22, wherein said inner walls include a transverse partition separating said first space from said second space and having a central opening therethrough adjacent said upstream side of said fan blades.*

*24. The treatment chamber of claim 23, wherein said nozzle means extend into said first space in the vicinity of said transverse partition so as to spray a cryogenic fluid against said upstream side of said fan blades through said central opening.*

*25. The treatment chamber of claim 22, further comprising exhaust means for exhausting gas from the interior of said chamber.*

*26. The treatment chamber of claim 22, wherein said first end closure is an access door.*

* * * * *